Aug. 21, 1928.
F. W. SCHNEIBLE
1,681,880
MACHINE FOR MAKING LOCK JOINT TUBING
Filed Aug. 10, 1925    2 Sheets-Sheet 1
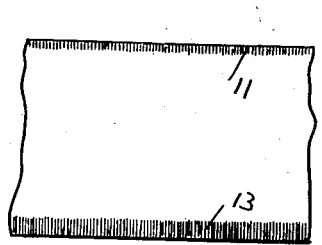
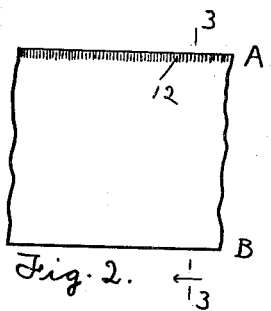
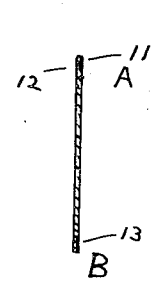
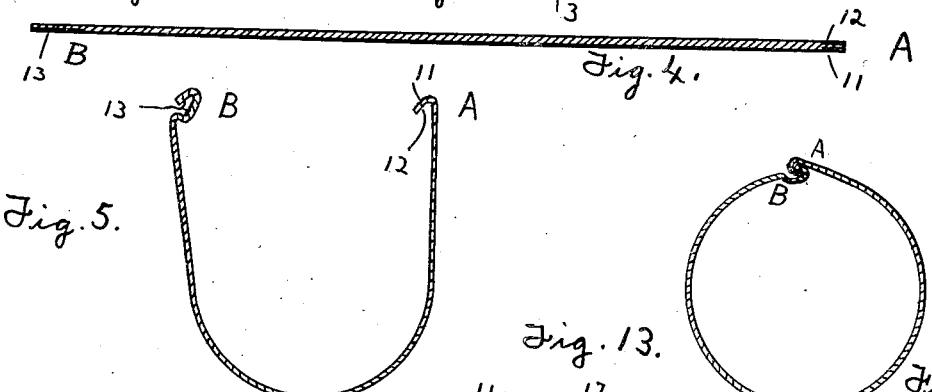
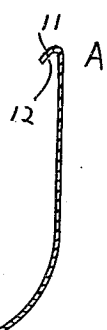
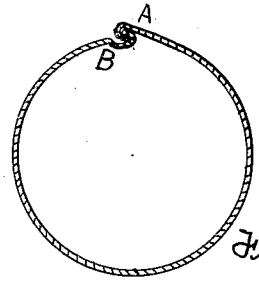
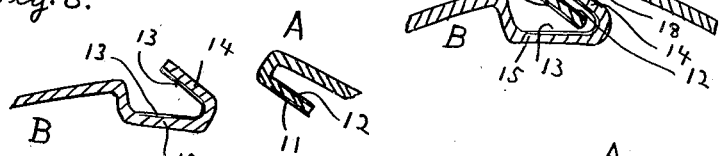
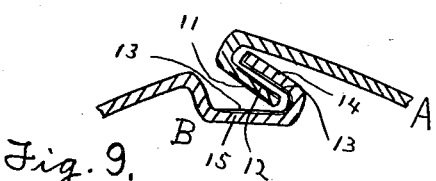
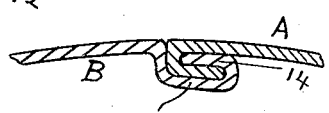
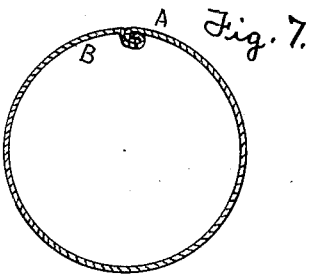
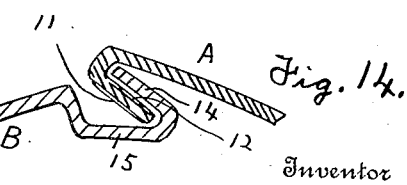
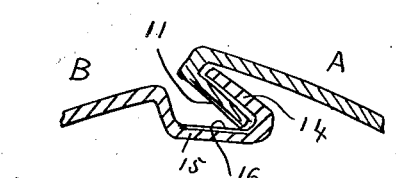
Inventor
Frank W. Schneible
By Martin & Rendell
Attorney.

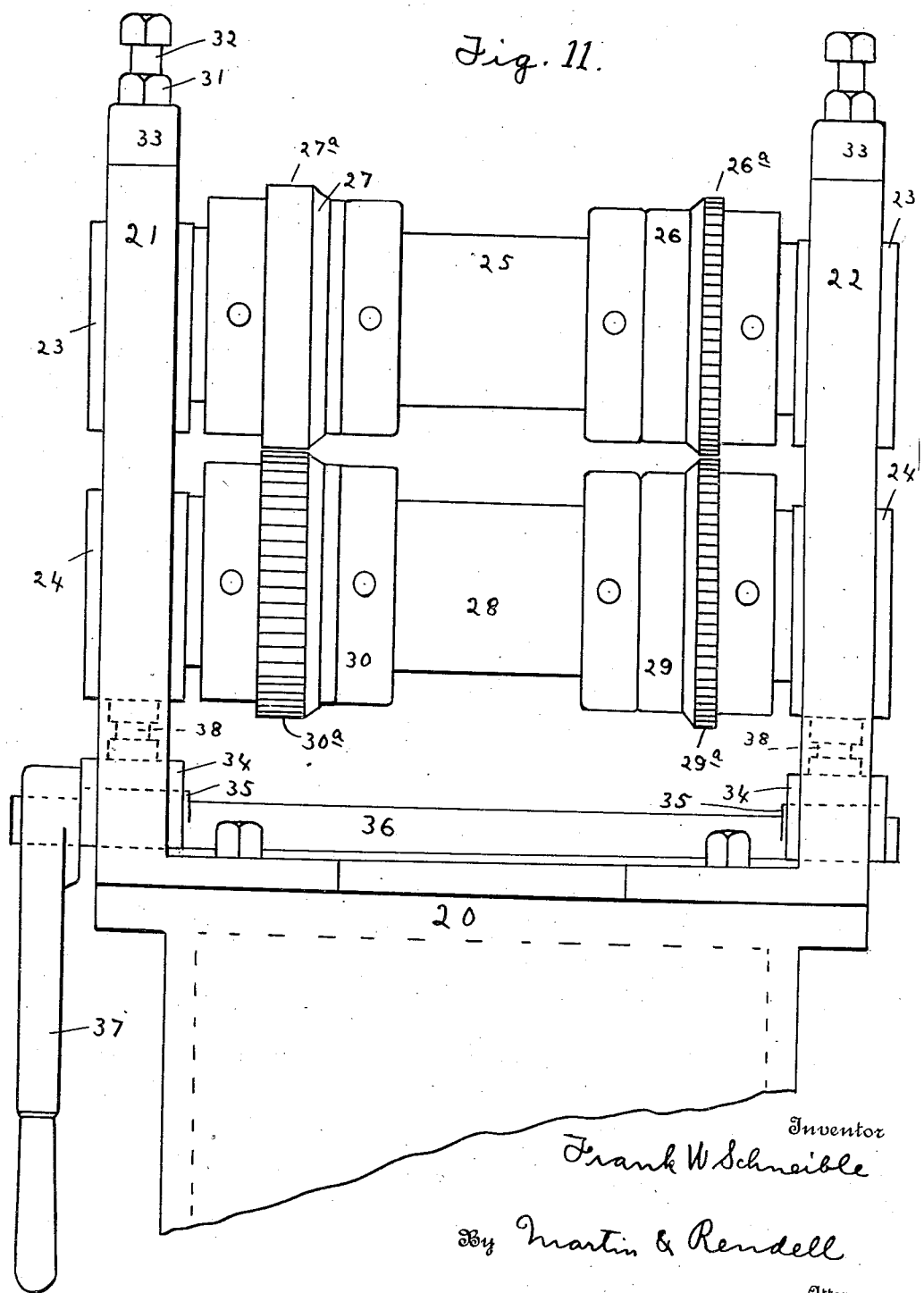

Patented Aug. 21, 1928.

1,681,880

UNITED STATES PATENT OFFICE.

FRANK W. SCHNEIBLE, OF ROME, NEW YORK, ASSIGNOR TO ROME MANUFACTURING COMPANY, OF ROME, NEW YORK, A CORPORATION.

MACHINE FOR MAKING LOCK-JOINT TUBING.

Application filed August 10, 1925. Serial No. 49,389.

My present invention relates to lock-joint metal tubing.

The purpose of my invention is to provide a new and improved form of lock-joint metal tubing and also to point out the process used in the making of said tubing and to produce a machine for the manufacture of such tubing.

In lock-joint metal tubing the opposite edges of a strip of sheet metal are formed into hooks, the strip of metal is bent into a more or less circular form and these hooks brought into engagement with each other and then closed down upon each other to complete the tubing. While this lock-joint does not pull apart the joint is not and especially under strain or after fabrication does not remain rigid; for instance when a length of it is subjected to a twisting strain the tube will twist through the interengaging hooks sliding slightly on each other; and this sliding is especially noticeable after the tubing has been subjected to a bending or other fabricating operation as when a length of it has been bent to form a head or foot frame of a bedstead. This slipping of the joint results in the tubing or the article made therefrom not having the rigidity which should be present in a really solid piece of tubing. The purpose of my invention is to overcome the above fault in lock-joint tubing and to provide lock-joint tubing which is rigid both in the original tubing and which stays rigid or non-slipping in its joint even after the tubing has been subjected to a bending or other fabricating operation or operations. I accomplish this by knurling or otherwise roughening the faces or certain of the faces adjacent the opposite edges of the strip of metal that are to interengage in the lock-joint. A further purpose is to point out the method of making lock-joint tubing with such an improved lock-joint and also to provide a machine well adapted to knurl the required surfaces of the strip of metal from which the tubing is to be made.

Further purposes and advantages of my invention will appear from the specifications and claims herein.

Figs. 1 and 2 are plan views respectively of the outside face and of the inside face of a short length of a strip of sheet metal as knurled preparatory to being formed into lock-joint tubing pursuant to my invention.

Fig. 3 is a sectional view on line 3—3 of Fig. 2.

Fig. 4 is a sectional view similar to Fig. 3 but on an enlarged scale.

Fig. 5 is a similar sectional view through the strip after it has had the hooks formed in its edges and has been rolled to be U-shaped in cross section.

Fig. 6 is a similar sectional view after the hooked edges have been brought into engagement but before the hooks have been closed upon each other.

Fig. 7 is a similar sectional view through the completed tubing.

Figs. 8, 9 and 10 are detailed sectional views on a greatly enlarged scale through the hooked edges as they appear in Figs. 5, 6 and 7 respectively.

Fig. 11 is a front elevation of a knurling machine adapted to knurl the edges of the strip of sheet metal preparatory to its being formed into tubing.

Figs. 12, 13 and 14 are detailed sectional views on a greatly enlarged scale through the hooked edges of tubing embodying various modifications of my invention.

In the drawings I have illustrated a product and a machine and suggested a process which embodies my invention in its preferred form but it will be understood that said drawings are illustrative of my invention and that as indicated in the claims herein my invention may be applied in a manner varying somewhat from the specific form shown in the drawings and described in detail in the specification.

Referring to the drawings in a more particular description it will be seen that the strip of sheet metal from which the tubing is to be formed has one or both of its surfaces roughened or knurled for a short distance in from its extreme edge at the two edges A and B of the strip. In the preferred form of my invention the edge A of the strip of metal has a relatively narrow band 11 on its outside face and a similar relatively narrow band 12 on its inside face knurled or otherwise roughened, while at the edge B of the metal only the outside or outer face of the metal is knurled as at the relatively wider band 13. Under this arrangement the edge A of the strip of metal is subsequently formed into what I will call for definiteness the inner hook and the edge B of the strip of metal will be formed into what I will call for definiteness the outer hook. An inspection of the drawings will then show that the inner hook has on its opposite faces the knurled bands 11 and 12 and that the relatively wider knurled band 13 formed on the edge B when said edge B has been formed into the outer hook has its knurled band 13 disposed partly upon the inwardly facing side of the portion 14 of this outer hook and partly upon the outwardly facing side of the portion 15 of this hook.

As the strip of metal is progressed through the machine the hooks will be brought into the position shown in Figs. 7 and 10. An inspection of the larger views Figs. 9 and 10 will show that the portion of the knurled band 13 on the part 14 of the outer hook will be opposite the knurled band 12 on the inner hook and that the portion of the knurled band 13 on the outwardly facing surface of the part 15 will be opposite the knurled band 11 on the inner hook. As the parts are pressed from the relative position in Fig. 9 into the permanent position shown in Fig. 10, it would be obvious that these two pairs of oppositely disposed knurled faces will be brought into intimate or very tight contact. The effect of the knurling or roughening of these knurled bands of metal is to produce small ridges of metal extending up from the general face of the material usually upon both sides of the slight depressions formed by the knurling rolls or other mechanism used to roughen or knurl the metal. These minute outstanding ridges especially in conjunction with the depressions will when the lock-joint is pressed tightly together, form a lock-joint which will not slip when a length of tubing is subjected to a twisting action and so will neutralize or greatly reduce any tendency of the tubing to twist for the reason that edges in the lock-joint can not now slip on each other. For the same reason the knurled surfaces will hold the two parts of the lock-joint permanently in position even though the tubing be subjected to bending or other fabricating operations.

In Figs. 1 to 10 I have shown my invention as utilizing two pairs of oppositely disposed knurled faces interengaging within the lock-joint for this construction I believe to be the preferred embodiment of my invention. In Fig. 12 I have shown a construction wherein only one pair of interengaging knurled surfaces are used, namely, at the band 11 on the inner hook and at the band 16 on the outer hook upon the outwardly facing surface of the portion 15 of this hook. It will be obvious that any other interengaging pair of surfaces might be knurled. It will also be obvious that the knurling or roughening may be upon three pairs of interengaging surfaces as shown in Fig. 13. This example of my construction varies from that shown in Figs. 1 to 10 in that there is a band of knurling at 17 upon the main body of the tube material adjacent the inner hook and a co-operating band as at 18 upon the outwardly facing surface of the portion 14 of the inner hook. It is believed however that the addition of this last pair of knurled surfaces is not necessary in order to effect a good non-slipping joint.

In Fig. 14 I have shown a construction where all the knurling is upon one part or edge of the tubing, say on edge A but it might be all upon the other part. This construction is within the broad scope of my invention and is a modification that is available for certain uses of tubing.

In Fig. 11 I have shown a front elevation of a machine for knurling a strip of metal from which is to be formed lock-joint tubing embodying my invention. The frame work of this machine consists of a base 20 from which extends upwardly two standards 21 and 22. These standards are spaced apart a proper distance and are provided with vertical slots in which are slidingly placed upper and lower bearing blocks 23 and 24. In the upper bearing blocks 23 are journaled the ends of shaft 25 carrying right and left hand knurling rolls 26 and 27. In the lower bearing block 24 are journaled the opposite ends of shaft 28 carrying right and left hand knurling rolls 29 and 30 arranged opposite to the right hand and left hand rolls 26 and 27 on the upper shaft.

The rolls shown in Fig. 11 are of such form and combination as to knurl a strip of sheet metal to form a lock-joint of the form shown in Figs. 1 to 10 inclusive, in other words the two right hand rolls 26 and 29 have a relatively narrow operative knurling face 26ª and 29ª respectively to form the narrow bands of knurling 11 and 12 upon the two sides of the edge A of the strip of metal. The lower left hand roll has a relatively wider operative face 30ª to form the wider band 13 of knurling upon the outside surface of the strip of metal at its end B. As the other or inner side of the edge B is not to be knurled the upper left hand roll is left smooth as at face 27ª forming an anvil face to co-operate with the lower knurling roll 30.

It will be understood that the rolls 26, 27, 29 and 30 will be so placed as to bear upon the edges of the strip of metal to be formed into tubing and that the rolls will be placed are adjusted at the proper distance longitudinally of the shafts to operate upon the different widths of metal according to the diameter of the tubing to be formed. It will also be understood that the two shafts will be at the proper distance apart to give the proper pressure to the knurling rolls according to the gauge of metal being operated upon.

Adjustment to the thickness or gauge of the metal is accomplished by each of the upper bearing blocks 23 being engaged by a draw screw 31 and a pressure screw 32 with said screws extending down into or to said bearing blocks through a bridge piece 33 formed integral with or secured to the top of the standards 21.

Normally the lower shaft 28 stays at one position vertically of the frame work but provision is made for lowering this shaft and therewith the lower rolls to introduce the strip of metal between the rolls. Such temporary adjustment is effected through providing a secondary block 34 slidingly mounted in each of the upright standards 21. In the bottom of each of these secondary blocks 34 is an upwardly extending recess in which is journaled an eccentric 35 mounted upon a shaft 36. Outside one of the blocks 34, the shaft 36 is provided with a hand lever fixed upon said shaft. The lower side of the eccentric 35 will bear upon suitable surfaces in the standards 21. It will now be seen that a partial rotation of handle 37 from position shown in Fig. 11 will allow shaft 28 to drop slightly and admit the end of a strip of metal. Screw threaded adjusting means 38 are located between the lower main bearing blocks 24 and the secondary blocks 34 so as to impart upward movement of the blocks 34 to the blocks 24.

The machine here shown may be adjusted to operate upon different widths of metal, by adjusting either the right hand or the left hand rolls or all of said rolls longitudinally of the shafts 25 and 28.

In all the forms of tubing embodying my invention it will be understood that the knurling is slight or shallow and does not extend into the sheet metal sufficiently to form serrations, knurling or unevenness on the other side of the material. It will be noted especially that the knurling is never placed on a surface that will be exposed when the tubing is completed. Consequently in the completed tube both the exposed surfaces, viz; the inside and the outside surfaces, of the tubing at the joint will be smooth or free from serrations or knurling so that the utility or appearance of the tubing will not be interferred with for any purpose.

What I claim as new and desire to secure by Letters Patent is:

1. In a machine for knurling the interengaging faces of the metal in lock-joint metal tubing prior to the metal being formed into tubing, the combination of a supporting frame, two oppositely located shafts, a pair of rolls on each shaft to engage the opposite surfaces of the strip of sheet metal which is to make the tubing adjacent the edges thereof, sufficient of said rolls having knurling faces to knurl the surfaces that are to interengage in the lock-joint and the remaining rolls having plain faces to form supporting anvil rolls and bearings in said frame for said shafts.

2. In a machine for knurling the interengaging faces of the metal in lock-joint metal tubing prior to the metal being formed into tubing, the combination of a supporting frame, two oppositely located shafts, a pair of rolls on each shaft adjustable lengthwise thereof to engage the opposite surfaces of the strip of sheet metal which is to make the tube adjacent the edges thereof, sufficient of said rolls having knurling faces adapted to knurl only the surfaces that are to interengage in the lock-joint and the remaining rolls having plain faces to form supporting anvil rolls and bearings in said frame for said shafts.

3. In a machine for knurling the interengaging faces of the metal in lock-joint metal tubing prior to the metal being formed into tubing, the combination of a supporting frame, two oppositely located shafts, a pair of rolls on each shaft to engage the opposite surfaces of the strip of sheet metal which is to make the tube adjacent the edges thereof, sufficient of said rolls having knurling faces adapted to knurl only the surfaces that are to interengage in the lock-joint and the remaining rolls having plain faces to form supporting anvil rolls and bearing blocks in said frame for said shafts, the blocks of one shaft being adjustable to adapt the machine for operating upon different thicknesses of metal.

4. In a machine for knurling the interengaging faces of the metal in lock-joint metal tubing prior to the metal being formed into tubing, the combination of a supporting frame, two oppositely located shafts, a pair of rolls on each shaft to engage the opposite surfaces of the strip of sheet metal which is to make the tube adjacent the edges thereof, sufficient of said rolls having knurling faces adapted to knurl only the surfaces that are to interengage in the lock-joint and the remaining rolls having plain faces to form supporting anvil rolls and bearing blocks in said frame for said shafts, the blocks for one shaft being operatively connected to eccentrically mounted secondary blocks whereby that shaft may be temporarily separated farther from the other shaft to introduce the metal strip.

5. In a machine for knurling the interengaging faces of the metal in lock-joint metal tubing prior to the metal being formed into tubing, the combination of a supporting frame, two oppositely located shafts, a pair of rolls on each shaft to engage the opposite surfaces of the strip of sheet metal which is to make the tube adjacent the edges thereof, sufficient of said rolls having knurling faces adapted to knurl only the surfaces that are to interengage in the lock-joint and the remaining rolls having plain faces to form supporting anvil rolls and bearing blocks in said frame for said shafts, the blocks of one shaft being adjustable to adapt the machine for operating upon different thicknesses of metal, the blocks for the other shaft being operatively connected to eccentrically mounted secondary blocks whereby that shaft may be temporarily separated farther from the other shaft to introduce the metal strip.

In witness whereof I have affixed my signature, this 5th day of August, 1925.

FRANK W. SCHNEIBLE.